United States Patent
Dice et al.

(10) Patent No.: US 8,473,772 B2
(45) Date of Patent: Jun. 25, 2013

(54) METHOD AND SYSTEM FOR PROVIDING A CURRENT TIME VALUE

(75) Inventors: David Dice, Foxboro, MA (US); Timothy Paul Marsland, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 450 days.

(21) Appl. No.: 12/898,371

(22) Filed: Oct. 5, 2010

(65) Prior Publication Data

US 2012/0084593 A1   Apr. 5, 2012

(51) Int. Cl.
*G06F 1/14*   (2006.01)

(52) U.S. Cl.
USPC .............................. 713/502; 713/323; 713/500

(58) Field of Classification Search
None
See application file for complete search history.

(56) References Cited

U.S. PATENT DOCUMENTS

| | | | |
|---|---|---|---|
| 7,188,060 B1* | 3/2007 | Adcock | 703/14 |
| 2009/0037585 A1* | 2/2009 | Miloushev et al. | 709/226 |
| 2010/0037081 A1* | 2/2010 | Froehlich et al. | 713/502 |

OTHER PUBLICATIONS

Mauro, J., McDougall, R., "Solaris Internals", Sun Microsystems Press, Jan. 2001, 3 pages.
Seqlock, http://web.archive.org/web/20060913000000/http://en.wikipedia.org/wiki/Seqlock, Sep. 13, 2006, 1 page.

* cited by examiner

*Primary Examiner* — Dennis M Butler
(74) *Attorney, Agent, or Firm* — Osha Liang LLP (57) ABSTRACT

A method for providing applications with a current time value includes receiving a trap for an application to access a time memory page, creating, in a memory map corresponding to the application, a mapping between an address space of the application and the time memory page in response to the trap, accessing, based on the trap, a hardware clock to obtain a time value, and updating the time memory page with the time value. The application reads the time value from the time memory page using the memory map.

20 Claims, 6 Drawing Sheets

METHOD AND SYSTEM FOR PROVIDING A CURRENT TIME VALUE

BACKGROUND

In general, the functionality of a computer system is achieved using the combination of hardware and software. The hardware includes functionality to execute the instructions defined in the software. The combination of the hardware and the software allows the user to perform various tasks, such as play games, perform word processing applications, perform complicated modeling of a region, design new technologies, and/or perform other such tasks.

In order to function properly, software may require the computer system to keep track of and provide software with a current time. For example, a database application may require the current time value in order to properly log when changes are made to the database. Similarly, a calendar application may rely on the current time value in order to issue reminders of calendar events. Email applications rely on clocks to determine when email is sent and received.

When an application requires the current time, a trap is issued to the kernel with a system call to obtain the current time value. In response to the trap, the computer system switches to kernel mode. Further, the kernel identifies the current time value. The kernel responds to the application with the current time value and control is switched back to the application. Thus, the application continues processing with the time value provided by the kernel. When the application requires an updated current time value, another trap is issued to the kernel.

SUMMARY

In general, in one aspect, the invention relates to a method for providing applications with a current time value. The method includes receiving a trap for an application to access a time memory page, creating, in a memory map corresponding to the application, a mapping between an address space of the application and the time memory page in response to the trap, accessing, based on the trap, a hardware clock to obtain a time value, and updating the time memory page with the time value. The application reads the time value from the time memory page using the memory map.

In general, in one aspect, the invention relates to a computer system that includes a processor having a hardware clock, memory having a time memory page, a time writer thread, and a kernel. The time writer thread includes functionality to access the hardware clock to obtain a time value, and update the time memory page with the time value. The kernel includes functionality to receive a trap for an application to access the time memory page, create, in a memory map corresponding to the application, a mapping between an address space of the application and the time memory page in response to the trap, and trigger the time writer thread to update the time memory page. The application reads the time value from the time memory page using the memory map.

In general, in one aspect, the invention relates to a computer readable medium that includes computer readable program code embodied therein for causing a computer system to perform a method. The method includes receiving a trap for an application to access a time memory page, creating, in a memory map corresponding to the application, a mapping between an address space of the application and the time memory page in response to the trap, accessing, based on the trap, a hardware clock to obtain a time value, and updating the time memory page with the time value. The application reads the time value from the time memory page using the memory map.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for providing a current time value. Specifically, in one or more embodiments of the invention, the current time value is stored in a time memory page. When an application requests the current time value, the kernel creates a mapping from the application's address space to the time memory page. The mapping is saved in the application's memory map. Thus, the application may issue a read request to the time memory page using the application's memory map in order to obtain the current time value. Further, the current time value time memory page may be updated while an application has a mapping to the time memory page. Thus, in one or more embodiments of the invention, the application may issue multiple read requests to the time memory page in order to obtain updated current time values.

Figure 1:
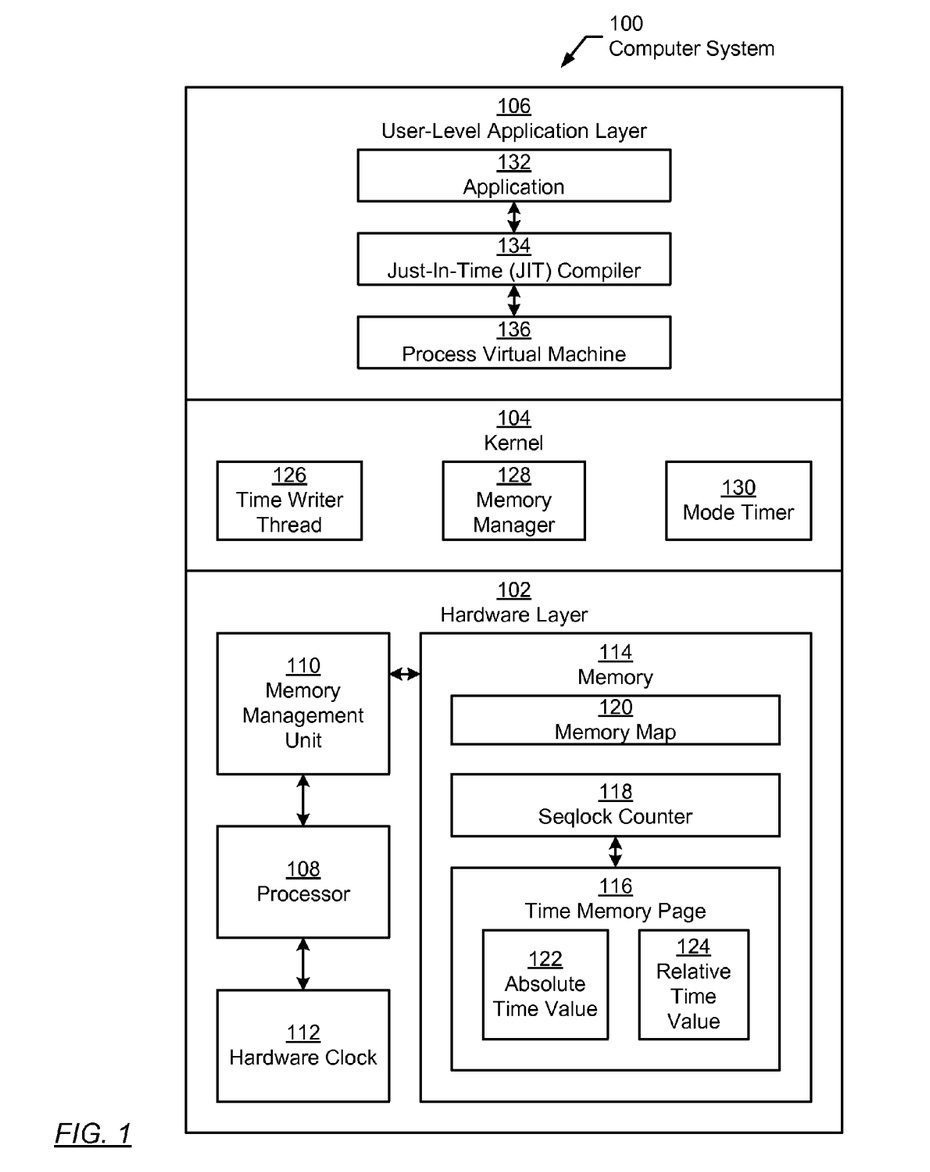
FIG. 1 shows a computer system in accordance with one or more embodiments of the invention.

FIG. 1 shows a computer system (100) in accordance with one or more embodiments of the invention. As shown in FIG. 1, the computer system (100) includes hardware layer (102), kernel (104), and user-level application layer (106). Each of these components is discussed below.

In one or more embodiments of the invention, the hardware layer (102) includes the hardware components of the computer system (100). Specifically, the hardware layer (102) may include a processor (108), memory management unit (110), hardware clock (112), and memory (114). In one or more embodiments of the invention, the processor (108) is a hardware device that includes functionality to process instructions. The processor (108) may be a single core or multi-core processor. Further, the computer system may include multiple processors. The multiple processors may be of various types.

In one or more embodiments of the invention, the processor (108) is operatively connected to a hardware clock (112). The hardware clock (112) is a hardware mechanism to track the current time.

In one or more embodiments of the invention, the computer system (100) may have one or more of the different types of hardware clocks. For example, the hardware clock (112) may be a real-time clock, a cycle-based clock, or another type of clock. A real-time clock tracks calendar absolute time. Specifically, the real-time clock is backed up a battery and persists over power up and down events. In one or more embodiments of the invention, the real-time clock is consulted only when the system boots in order to establish the internal software representation of absolute time.

Another type of hardware clock (112) may be a cycle-based counter that can be read. The cycle-based clock may have high precision and count monotonically since the processor (108) was last reset. Each processor (108) in a multi-processor computer system may include a separate own cycle-based clock. The cycle-based clock may be subject to skew or drift. Thus, in embodiments in which the computer system is a multi-processor computer system, the cycle based clock on different processors (108) may have different time values at the same time.

The hardware clock (112) and other components of the hardware layer (102) may be configured to trigger a clock interrupt at some time in the future. For example, in one or more embodiments of the invention, the kernel (discussed below) may program the clock interrupt to interrupt periodically at a fixed rate.

In one or more embodiments of the invention, the processor is operatively connected to a memory management unit (MMU) (110). The MMU (110) includes functionality to perform a translation from the virtual address provided by the process to a physical address required to access data in memory (114). The MMU (110) identifies the physical address of the data in the page of memory from the virtual address. The MMU (110) may identify the physical address using any of the variety of mechanisms known in the art, such as a translation lookaside buffer (TLB), page table, and/or another type of table. When the physical address cannot be identified by the MMU (110), the MMU (110) generates a page fault. The page fault results in a notification to the kernel (104) (described below) that a new page of memory needs to be allocated.

While FIG. 1 has a MMU (110), those skilled in the art will appreciate that the computer system may not include an MMU (110). Specifically, the functionality performed by the MMU (110) may be performed by one or more other components of the computer system (100).

Continuing with FIG. 1, the MMU (110) is operatively connected to memory (114) in accordance with one or more embodiments of the invention. Memory (114) is a physical device for storing data. In one or more embodiments of the invention, the data in memory includes a time memory page (116), a seqlock counter (118), and a memory map (120).

In one or more embodiments of the invention, the time memory page (116) is a physical page in memory (114) for storing current time values. In one or more embodiments of the invention, the time memory page (116) is a dedicated physical memory page. Specifically, in one or more embodiments of the invention, the time memory page (116) may be in a fixed location of memory. The time memory page stores current time values. The current time values may include an absolute time value (122) and a relative time value (124) in one or more embodiments of the invention.

In one or more embodiments of the invention, an absolute time value (122) provides the current calendar time (e.g., time of day, day, month, year). Absolute time value (122) may be stored as the amount of time that elapsed from a pre-defined date and time. In one or more embodiments of the invention, software is programmed to calculate the current calendar time using the absolute time and the predefined date and time. For example, absolute time value (122) may be expressed as the number of seconds and microseconds that elapsed since 00:00:00 UTC (Coordinated Universal Time) on Jan. 1, 1970.

In one or more embodiments of the invention, relative time value (124) provides an elapse time from a pre-defined event. Specifically, relative time value (124) may be expressed as the length of time since some arbitrary time in the past. For example, the relative time value (124) may be expressed as the number of nanoseconds since the computer system was booted, or since another event occurred. The relative time value (124) may additionally or alternatively express as the amount of time that elapsed since the absolute time value (122) was last updated.

Additionally or alternatively, other current time values may be stored on the time memory page. For example, the current time values on the time memory page may include a counter representing the number of ticks of the kernel (104) clock interrupt to express relative time, a system clock rate period (e.g., measured in Hertz) defining how many ticks are in a specific period of time, and a time-of-day adjustment to reflect the difference between relative time and absolute time. In the example, only the relative time is frequently updated. Further, in the example, when a current time value is the number of ticks of the kernel, clock drift may be corrected by periodic reconciliation between the clock ticks and the time-of-day adjustment.

Continuing with FIG. 1, the time memory page (116) is connected to a seqlock counter (118) in accordance with one or more embodiments of the invention. In one or more embodiments of the invention, a seqlock counter is a locking mechanism used for processes to determine whether the data protected by the seqlock counter has changed. The seqlock counter (118) provides concurrency control for access by multiple threads to the time values on the time page. In one or more embodiments of the invention, the seqlock counter (118) is a simple atomically addressable word located at a predefined location on the time memory page (116).

In one or more embodiments of the invention, the seqlock counter (118) protects time values that span multiple words, and as such cannot be accessed atomically with a simple load or store instructions. Thus, to query the time the application (discussed below) may fetch from the multiple words on the time memory page. The seqlock counter (118) provides concurrency control so that the application (discussed below) is able to determine whether the obtained portions of time values are mutually consistent.

Specifically, the value of the seqlock counter (118) is changed before updating the time memory page with one or more current time values and after updating the time memory page with the one or more current time values. Thus, the thread that writes to the time memory page updates the seqlock counter value. Threads that only read from the time memory page do not update the seqlock counter value, but rather may use the seqlock counter value to determine whether the time memory page was updated during the reading.

In one embodiment of the invention, a memory map (120) corresponds to an association between virtual pages in the application's address space and physical pages. The association further includes permissions for accessing the physical pages. Thus, for example, the permissions may specify that an application can only read from specified pages. In one or more embodiments of the invention, one of the associations is a mapping to the time memory page (116). In one or more embodiments of the invention, each application may have a distinct memory map (120) corresponding to the application. Further, each process executing for an application may have a distinct memory map (120) corresponding to the process.

The memory map (120) provides a mechanism for the application (132) to access the time memory page (116) as if the application is accessing the application's address space. Specifically, rather than the application (132) acquiring permissions for each access to the memory map (120) from the kernel (104), once an entry is added to the application's memory map for the time memory page (116), the application (132) may access the time memory page (116) without obtaining any permissions from the kernel.

Continuing with FIG. 1, the kernel (104) is a component of the computer system's operating system (not shown). Specifically, the kernel (104) is software that manages applications use of the computer system's hardware. Thus, the kernel (104) determines when and whether a user-level application (132) can access a resource of the computer system (100). The separation by the kernel (104) between the hardware (102) and the user-level application (132) allows for stability and security in the computer system and for the user-level application (132) to operate without requiring knowledge of the underlying hardware. For example, the kernel (104) is responsible for allocating memory in hardware for a user-level application (132) to use when executing. When the user-level application requests memory, rather than simply returning to the user the physical address (i.e., disk, block, sector, etc.) the kernel (104) creates a virtual address space for the user-level application (132), thereby isolating the application (132) from the hardware (102). In one or more embodiments of the invention, the kernel (104) is a component of a computer system's operating system.

In one or more embodiments of the invention, the kernel may have a tickful mode and a tickless mode. In the tickful mode, the kernel employs a clock interrupt to track the current time value from the hardware clock (112). The kernel may program the hardware to arrange for subsequent clock interrupts in the tickful mode. In the tickless mode, the kernel (104) does not perform a clock interrupt to obtain the current time from the hardware clock (112). Specifically, the kernel (104) does not track the current time in the tickless mode. Thus, in the tickless mode, the processor (108) may enter a lower power state.

In addition to the hardware clock (112) discussed above, the computer system (100) may also include a software clock (not shown) that is driven by hardware clock interrupts. Specifically, the kernel (104) may control the rate or, equivalently, the time of the next clock interrupt, relative to the current time. For example, the kernel may configure the next clock interrupt in 10 milliseconds. A tickless kernel may forgo the fixed rate and simply program the clock tick interrupt to fire at the next needed time, allowing the computer system (100) to potentially stay in a low power state until the time of the next interrupt.

The kernel includes a time writer thread (126), a memory manager (128), and a mode timer (130) in accordance with one or more embodiments of the invention. Each of the components is discussed below.

In one or more embodiments of the invention, the time writer thread (126) includes functionality to obtain the current time value and store the current time value in the time memory page (116). In one or more embodiments of the invention, the time writer thread (126) includes functionality to update of the time memory page (116) according to a predefined rate. For example, the predefined rate may be every millisecond. In one or more embodiments of the invention, the time writer thread (126) may be in a quiesced mode or an active mode. In a quiesced mode, the time writer thread does not perform any operations. In the active mode, the time writer thread (126) periodically updates the time memory page (116).

In one or more embodiments of the invention, the memory manager (128) includes functionality to manage access to memory (114). Specifically, the memory manager (128) includes functionality to receive memory access request(s), allocate memory pages to application, create memory map(s) (120), and add and remove entries in the memory map(s) (120). Further, in one or more embodiments of the invention, the memory manager (128) includes functionality change the time writer thread (126) between the quiesced mode and the active mode.

In one or more embodiments of the invention, the mode timer (130) is a timer for determining whether to switch the time writer thread (126) to the quiesced mode from the active mode. Specifically, the mode timer (130) is configured to detect when the time memory page (116) has not be accessed by an application (132) within a predefined duration of time. The mode timer (130) is activated when the time writer thread is in an active mode and updating the time memory page (116). The mode timer (130) is reset with each access by an application (132) to the time memory page (116). Thus, the value of the mode timer provides the amount of time since the last access to the time memory page (116) by an application (132). The mode timer (130) is determined to expire when the mode timer (130) reaches a maximum value in embodiments where the mode timer (130) increments with the passage of time or a minimum value in embodiments where the mode timer (130) decrements with the passage of time. The mode timer (130) may be implemented in hardware or software. Further, in one or more embodiments of the invention, the mode timer (130) may be implemented as part of the time writer thread (126).

As discussed above, the kernel (104) communicates with a user-level application layer (106). The user-level application layer (106) is an execution environment for user-level applications. In one or more embodiments of the invention, the user-level application layer (106) may include an application (132), a just-in-time (JIT) compiler (134) and a process virtual machine (136).

An application (132) is any type of user-level software that executes on the computer system (100). Specifically, the application uses the kernel to access the resources of the computer system (100). In one or more embodiments of the invention, the application (132) may include instructions to request the current time value. The following is a discussion of two types of instructions to request the current time value. Embodiments of the invention may support only one type of instruction, both types of instructions, and/or another type of instruction for requesting the current time value.

In one or more embodiments of the invention, the first type of instruction to request the current time may be a system call to the kernel (104). In general, a system call is how an application requests a service from the kernel (104). For example, if the application (132) is written in an object oriented programming language, the system call may be an instruction to return the current time from the system object. Other types of programming languages may have different types of system calls. The system call may be a request for the kernel (104) to obtain the current time value. In one or more embodiments of the invention, applications which are not natively designed to use the time memory page (116) may use a system call instruction(s).

In one or more embodiments of the invention, the second type of instruction for the application (132) to obtain the current time value is an instruction to obtain the time from the time memory page (116). Specifically, the application (132) may include the instruction to request a mapping to the time memory page (116) and a memory instruction to read the current time value from the time memory page (116).

Continuing with the user-level application layer (106), the application (132) may be connected to the JIT compiler (134). A JIT compiler (134) includes functionality to compile instructions for the application (132) into machine code. In one or more embodiments of the invention, as part of the compilation, the JIT compiler includes functionality to translate a system call instruction for a current time value into a memory read operation to read the current time value from the time memory page (116). When the application (132) includes only instructions to read the current time value from the time memory page (116) rather than a system call for the current time value, the JIT compiler may or may not include functionality to translate the system call instruction for the current time value into the memory read operation.

In one or more embodiments of the invention, the machine code may be interpreted by the process virtual machine (136). The process virtual machine (136) executes as a normal application within an operating system. The process virtual machine may include functionality to provide a platform-independent programming environment. Specifically, the process virtual machine provides a level of abstraction between the operating system and the application (132). Thus, the application (132) may execute in the same way on any operating system.

As an alternative to a physical device, the computer system (100) may be a virtual system executing in a partition of a physical computing device. In the scenario in which the computer system (100) is a virtual computer system, the hardware layer (102) corresponds to hardware resources (e.g., portions of memory, time on the processor) allocated to the partition.

For example, the partition may be a software partition. For example, a physical computer system may include a host operating system (not shown) configured to execute one or more system virtual machines Broadly speaking, the system virtual machines are distinct operating environments configured to inherit underlying functionality of the host operating system via an abstraction layer. In one or more embodiments of the invention, each system virtual machine includes a separate instance of an operating system. For example, the Xen® virtualization project allows for multiple guest operating systems executing in a host operating system. Xen® is a trademark overseen by the Xen Project Advisory Board.

Figure 2:
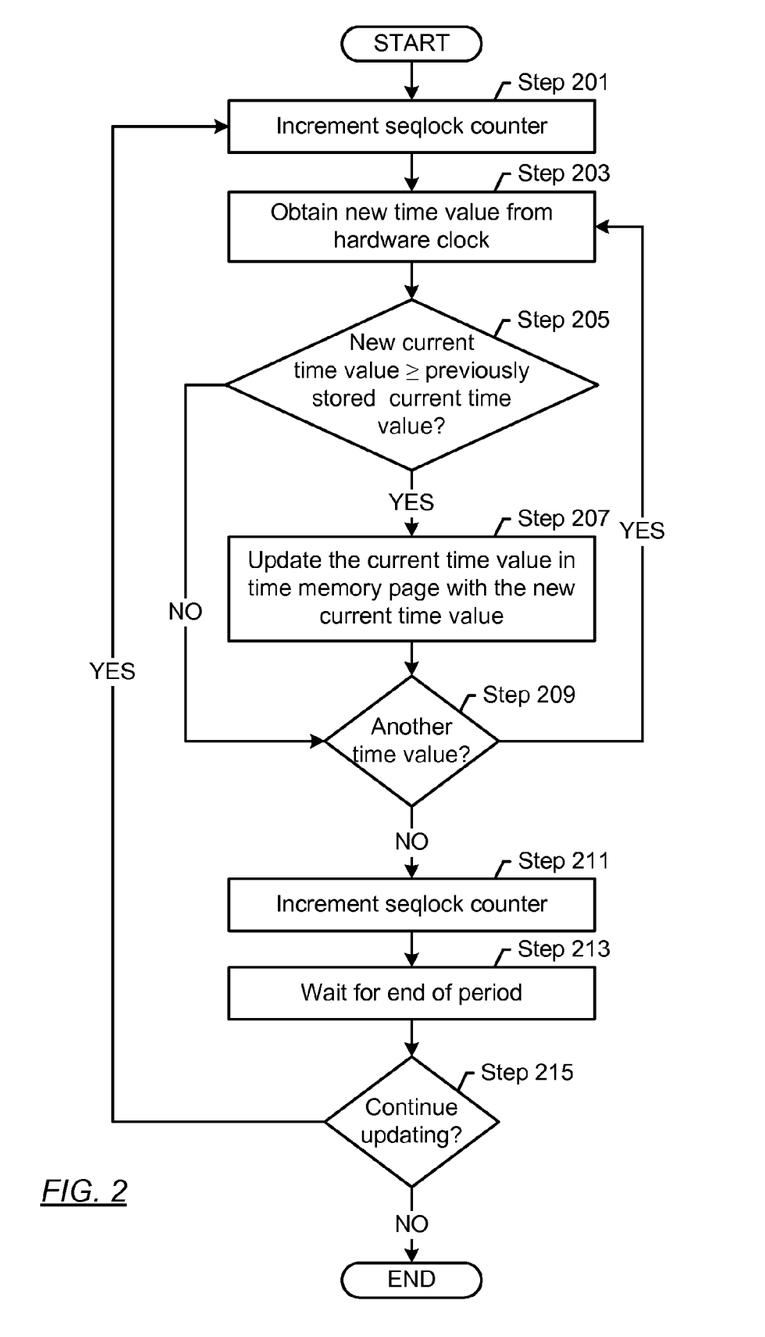
FIGS. 2-4 show flowcharts in accordance with one or more embodiments of the invention.
Figure 3:
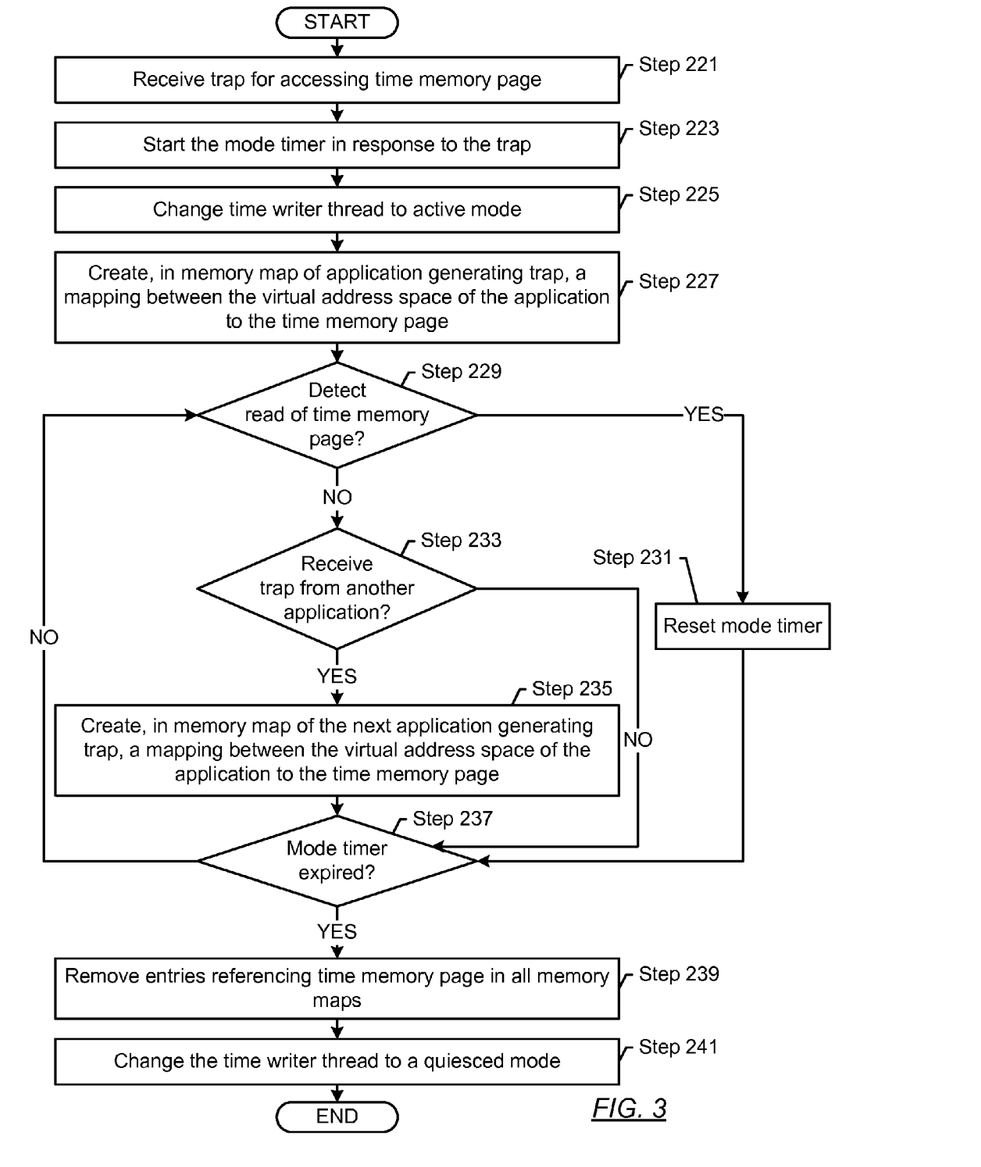
Figure 4:
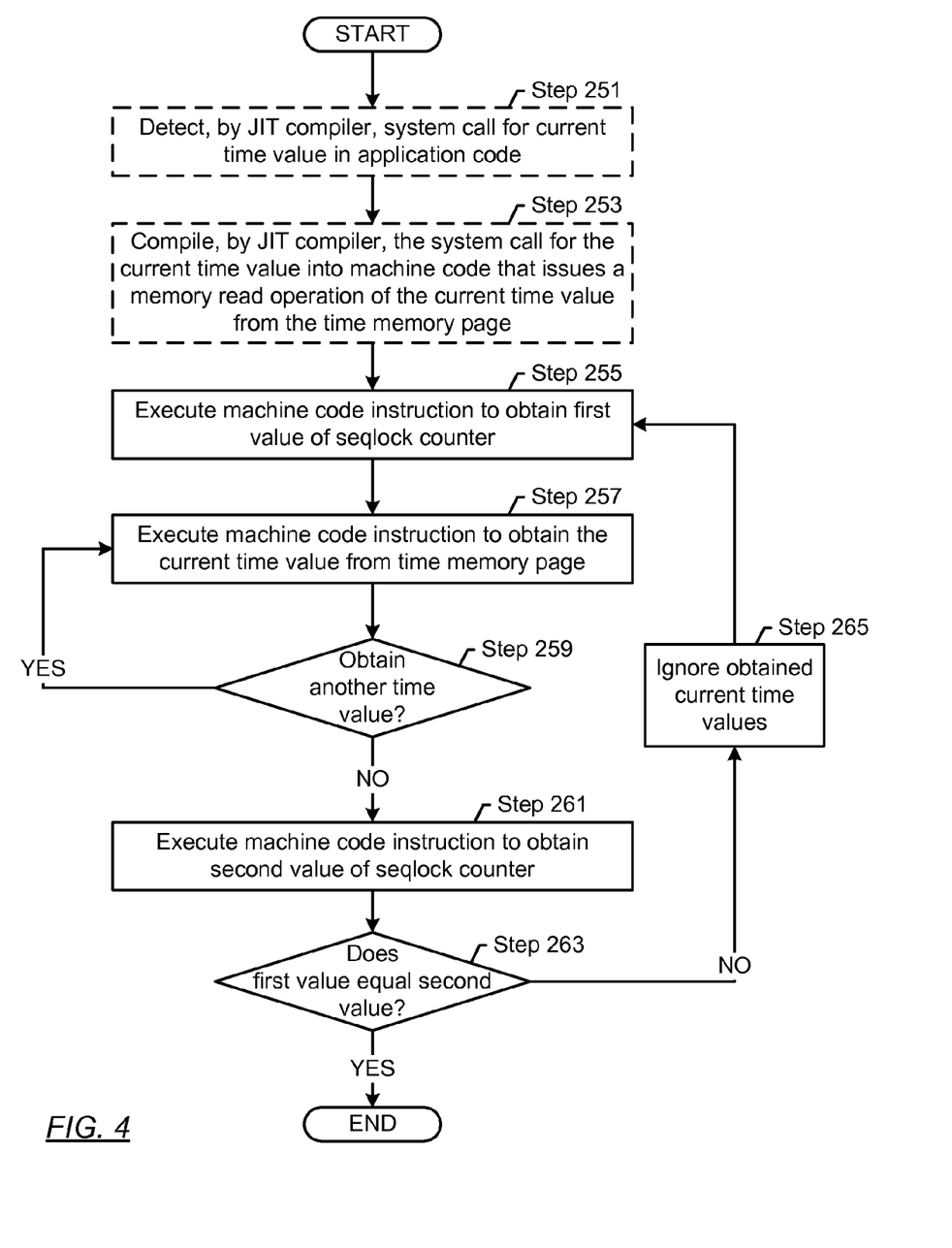

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for the time writer thread to update the time memory page in accordance with one or more embodiments of the invention. In one or more embodiments of the invention, the time writer thread updates the time memory page when the time writer thread is in the active mode.

In Step 201, the time writer thread increments the seqlock counter in one or more embodiments of the invention. By incrementing the seqlock counter, the time writer thread indicates to applications that the time writer thread is in the process of updating the time memory page.

In Step 203, the time writer thread obtains a new time value from the hardware clock in one or more embodiments of the invention. The time writer thread may obtain the value directly or indirectly from the hardware clock. Specifically, the time writer thread may obtain the value from any of the hardware or software clocks discussed above with reference to FIG. 1.

In Step 205, the time writer thread determines whether the new current time value obtained in Step 203 is at least as great as the time value currently stored on the time memory page in one or more embodiments of the invention. Specifically, the time writer thread ensures that the time values stored are not decreasing. The newly obtained time value may be less than a previously store time value when the time writer thread obtains the newly obtained time value and the previously stored time value from different hardware clocks, such as in a multi-processor system. Thus, in one or more embodiments of the invention, the time writer thread performs the check when the time writer thread is executing on a multiprocessor system.

In Step 207, the time writer thread updates the current time value in the time memory page with the new current time value when the new current time value is at least as great as the previously stored time value. Specifically, the new current time value replaces the previously stored current time value in the time memory page in one or more embodiments of the invention.

In one or more embodiments of the invention, if the current time value being updated is the absolute time, then the current time value may require that multiple separate updates. For example, absolute time may be stored as two sixty-four bit words, which cannot be updated atomically. In such a scenario, the absolute time may be updated in two separate updates, one for each sixty-four bit word. Although not shown in FIG. 2, when the current time value requires multiple separate updates, a separate seqlock counter may exist for the current time value in one or more embodiments of the invention. In such a scenario, the time writer thread may increment the separate seqlock counter before the first update to the current time value and after the last update to the current time value.

In Step 209, a determination is made whether to update another current time value on the time memory page. If a determination is made to update another current time value, then the next current time value on the time memory page is obtained in Step 203.

In Step 211, if a determination is made not to update the current time value, the time writer thread updates the seqlock counter for the time memory page. By incrementing the seqlock counter at the end of updating the time memory page, the time memory thread indicates to the applications that the updates to the time memory page is complete. Specifically, in embodiments of the invention in which the seqlock counter value is incremented to an odd number when the time writer thread starts updating the time memory page, then the time writer thread indicates to applications that the update is complete when the seqlock counter value is incremented to an even number. Similarly, in embodiments of the invention in which the seqlock counter value is incremented to an even number when the time writer thread starts updating the time memory page, then the time writer thread indicates to applications that the update is complete when the seqlock counter value is incremented to an odd number. Although the above discussion is with regards to incrementing the seqlock counter, the seqlock counter may be decremented without departing from the scope of the invention. Specifically, the time writer thread may only decrement the seqlock counter in Step 211 and 201 without departing from the scope of the invention.

Continuing with FIG. 2, in Step 213, the time writer thread waits for the end of the period in one or more embodiments of the invention. Specifically, as discussed above, the time writer thread updates the time memory page at a predefined rate. According to the predefined rate, the time writer thread waits until the next time to start updating the time memory page.

In Step 215, a determination is made whether to continue updating the time memory page. For example, if applications have not accessed the time memory page before the mode timer expired, the kernel may change the time writer thread to the quiesced mode. Alternatively, if the determination is made to continue updating the time memory page, then the time writer thread repeats the steps discussed above to update the time memory page.

FIG. 3 shows a flowchart for the kernel in accordance with one or more embodiments of the invention. FIG. 3 starts from the perspective that the update time is not yet updating the time memory page.

In Step 221, the kernel receives a trap for accessing the time memory page. The trap indicates to the kernel that the application is attempting to access a memory page in which the application does not have a mapping. Based on the trap, the kernel detects that the memory page is the time memory page and therefore may require specific instructions to be executed.

In Step 223, the kernel starts the mode timer in response to the trap in one or more embodiments of the invention. Specifically, the kernel detects that the time writer thread is in quiesced mode and the mode timer is not in a timing mode. In response, the kernel activates the mode timer to start the timing. Further, in Step 225, the kernel triggers the time writer thread to update the time memory page in one or more embodiments of the invention. Specifically, the kernel may change the time writer thread to an active mode from the quiesced mode. Accordingly, as discussed in FIG. 2, the time memory page is updated with the current time.

In Step 227, the kernel creates in the memory map of the application generating a trap, a mapping between the virtual address space of the application and the time memory page. Specifically, an entry is added to the memory map that maps the address space of the application to the time memory page. By creating the mapping, the kernel allows the application to directly access the time memory page.

In Step 229, a determination is made whether a read of the time memory page is detected. Specifically, a determination is made whether an application is reading the current time value from the time memory page. If a read of the time memory page is detected, then the mode timer is reset in Step 231. By resetting the mode timer, the mode timer is able to track the amount of time since the last read to the time memory page in one or more embodiments of the invention.

In Step 233, a determination is made whether a trap is received from another application. As discussed above, the trap indicates to the kernel that another application is attempting to access a memory page in which the application does not have a mapping.

In response to the trap, the kernel may create in the memory map of the other application generating the trap, a mapping between the virtual address space of the other application to the time memory page. Specifically, multiple applications may each have a simultaneous mapping to the same time memory page. The multiple mappings allow each of the applications to access the time memory page without regards to whether other applications can access the time memory page. When the kernel receives a trap to access the time memory page, the kernel may determine that the time writer thread and the mode timer are already started, and therefore only update the memory map of the application generating the trap. Updating the memory map may include creating the memory map in accordance with one or more embodiments of the invention.

Continuing with FIG. 3, in Step 237, a determination is made whether the mode timer expired. Specifically, as discussed above, the mode timer indicates the length of time since an application last read from the time memory page. The mode timer expires when an application has not read from the time memory page within the required time period.

In Step 239, when the mode timer expires, the kernel removes entries referencing the time memory page in all memory maps. Thus, subsequent reads to the time memory page by an application results in a trap to the kernel. The kernel may respond to the subsequent reads starting with Step 221 (discussed above).

In Step 241, the kernel changes the time writer thread to a quiesced mode in one or more embodiments of the invention. By changing the time writer thread to the quiesced mode, the kernel allows the processor to change to a low power state.

FIG. 4 shows a flowchart for an user-level application to obtain one or more current time values in accordance with one or more embodiments of the invention. In Step 251, a JIT compiler may detect a system call for the current time value in application code in one or more embodiments of the invention. In Step 253, the JIT compiler compiles the system call for the current time value into machine code that issues a memory read operation of the current time value from the time memory page. Specifically, the JIT compiler may change the system call into the appropriate instructions to use the time memory page. Steps 251 and 253 are shown in FIG. 4 as optional depending on implementation. Specifically, in one or more embodiments of the invention, as discussed above, an application may include system calls to obtain the current time value which are compiled into the appropriate machine code by the JIT compiler.

Continuing with FIG. 4, in Step 255, a machine code instruction to obtain the first value of the seqlock counter is executed. Further, in Step 257, a machine code instruction is executed to obtain the current time value from the time memory page. Specifically, the application reads the current time value from the time memory page. As discussed above, as used herein, the machine code instruction may correspond to a read operation or a load operation to obtain the time value from the time memory page.

In Step 259, a determination is made whether to read another current time value from the time memory page. Specifically, the application may require multiple current time values that are mutually consistent in order to obtain the current time. For example, the multiple current time values may be the relative time and the absolute time. As another example, the multiple current time values may be the counter representing the number of ticks of the kernel, the system clock rate period, and the time-of-day adjustment. If the determination is made that another current time value is needed, then the next current time value is obtained in Step 259.

In Step 261, if a determination is made that another current time value is not obtained, then a machine code instruction is executed to obtain a second value of the seqlock counter. In Step 263, the determination is made whether the first value of the seqlock counter is equal to the second value of the seqlock counter. As discussed above, the application uses the seqlock counter to ensure that mutually consistent values are obtained from the time memory page. In other words, if the first value of the seqlock counter matches the second value of the seqlock counter, then the application is assured that the time writer thread is not actively updating the time memory page such that one current time value is updated without a required update having not yet been performed on a corresponding current time value.

However, if the first seqlock counter is not equal to the second seqlock counter, then the application ignores the obtained current time values in Step 265 in one or more embodiments of the invention. Specifically, the application determines that the obtained current time values are potentially inconsistent.

Although not discussed in FIG. 4, as discussed above with reference to FIG. 2, in embodiments of the invention in which the seqlock counter value is incremented to an odd number when the time writer thread starts updating the time memory page, then the application ignores the obtained current time values when any of the first seqlock counter value or the second seqlock counter value is odd. Similarly, in embodiments of the invention in which the seqlock counter value is incremented to an even number when the time writer thread starts updating the time memory page, then the application ignores the obtained current time values when any of the first seqlock counter value or the second seqlock counter value is even.

If the application determines that updating the time memory page is not actively being performed while the application is obtaining the current time values, the application may use the current time values.

Figure 5:
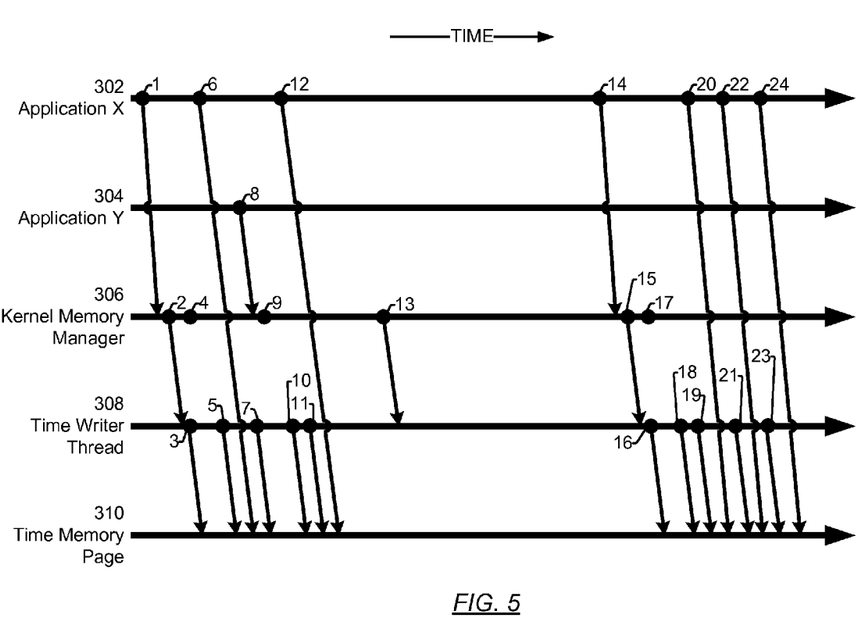
FIG. 5 shows a schematic diagram in accordance with one or more embodiments of the invention.

FIG. 5 shows an example timing diagram in accordance with one or more embodiments of the invention. The following example is for explanatory purposes only and not intended to limit the scope of the invention. For the following example, consider the scenario in which a computer system (not shown) is executing two user level applications (e.g., Application X (302) and Application Y (304)). A kernel memory manager (306) and time writer thread (308) are also executing on the computer system. The memory of the computer system includes time memory page (310). FIG. 5 shows an example timing diagram for Application X (302) and Application Y (304) to obtain the current time value in accordance with one or more embodiments of the invention. For clarity purposes, responses to communications are not shown in FIG. 5.

In the example, at time 1, Application X (302) issues a request to read a current time value from the time memory page (310). Because Application X's memory map (not shown) does not include an entry that maps Application X's address space (not shown) to the time memory page (310), the request results in a trap to the kernel. At time 2, in response to the trap, the kernel memory manager (306) starts the time writer thread (308) to start updating the time memory page (310). Accordingly, the time writer thread (308) starts updating the time memory page (310) with current time values at time 3. At time 4, in response to the trap, the kernel memory manager (306) adds an entry in Application X's memory map that maps Application X address space to the time memory page.

In the example, on completion of kernel memory manager's response to the trap, the time writer thread (308) independently on a predefined rate updates the time memory page (310). Specifically, the time writer thread may update the time memory page (310) at time 5, time 7, and time 11 as shown in example FIG. 5. Application X (302) obtains the current time value from the time memory page (310) on completion of the trap. Additionally, Application X (302) may obtain subsequent current time values without intervention by the kernel. In particular, at time 6 and at time 12, Application X (302) obtains the current time from the time memory page (310) by reading the current time value from the time memory page.

Further, in the example, consider the scenario in which at time 8, Application Y (304) requires the current time value. In the example, Application Y (304) issues a request to read a current time value from the time memory page (310). Because Application Y's memory map (not shown) does not include an entry that maps Application Y's address space (not shown) to the time memory page (310), the request results in a trap to the kernel. The kernel determines that time writer thread (308) is already in an active mode. Thus, in response to the trap at time 9, the kernel memory manager (306) adds an entry in Application Y's memory map that maps Application Y address space to the time memory page. Thus, on completion of the trap, Application Y (304) obtains the current time value from the time memory page (310).

Continuing with example FIG. 5, consider the scenario at time 13, the kernel determines that an application (e.g., Application X (302) or Application Y (304)) has not read the current time value from the time memory page (310) in more than a predefined length of time. Specifically, the mode timer expired at time 13. In response, the kernel memory manager changes the time writer thread (308) to quiesced mode and removes entries mapping to the time memory page (310) in Application X's memory map and Application Y's memory map.

In the example, at time 14, Application X (302) issues a request to read a current time value from the time memory page (310). Because the entry in Application X (302) to the time memory page (310) was removed in Step 13, the request results in a trap to the kernel. At time 15, in response to the trap, the kernel memory manager (306) starts the time writer thread (308) to start updating the time memory page (310). Accordingly, the time writer thread (308) starts updating the time memory page (310) with current time values at time 16. At time 17, in response to the trap, the kernel memory manager (306) adds an entry in Application X's memory map that maps Application X address space to the time memory page (310).

Thus, on completion of kernel memory manager's response to the second trap by Application X (302), the time writer thread (308) independently on a predefined rate updates the time memory page (310) at time 16, time 18, time 19, time 21, and time 23 as shown in example FIG. 5. Application X (302) obtains the current time value from the time memory page (310) on completion of the trap. Additionally, at time 20, time 22, and time 24, Application X (302) obtains the current time from the time memory page (310) by reading the current time value from the time memory page.

In the example, each time Application X (302) obtains the current time value, Application X (302) may obtain a first value of the seqlock counter immediately before reading the time memory page and a second value of the seqlock counter immediately after reading the time memory page. If the first value of the seqlock counter matches the second value and both values, then Application X (302) uses the time value from the time memory page. Otherwise, Application X (302) discards the time value from the time memory page and obtains a new time value. Thus, Application X (302) is assured that the time writer thread (308) is not in the process of writing to the time memory page while Application X (302) is reading from the time memory page. Application Y (304) may perform similar steps each time Application Y (304) reads from the time memory page.

As shown by way of the above example, the applications are able to obtain the current time value by simply reading from the time memory page via each application's memory map. Thus, when the time writer thread is actively writing to the time memory page, the applications avoid the time necessary to perform system calls to the kernel to obtain the current time value in one or more embodiments of the invention. Additionally, in one or more embodiments of the invention, when the time writer thread is not actively writing to the time memory page, the hardware processors on the computer system are able to remain in a low power state.

The above example may be extended when the time writer thread, applications, and kernel are executing on a multi-processor system. Specifically, on a multi-processor system, the time writer thread compares the time value on the time memory page with the newly obtained time value to ensure that reported time is not decreasing over time in one or more embodiments of the invention. Because the comparison is performed once for each update to the time memory page, an application is not required to wait to obtain the current time value on each access to the time memory page in one or more embodiments of the invention.

Figure 6:
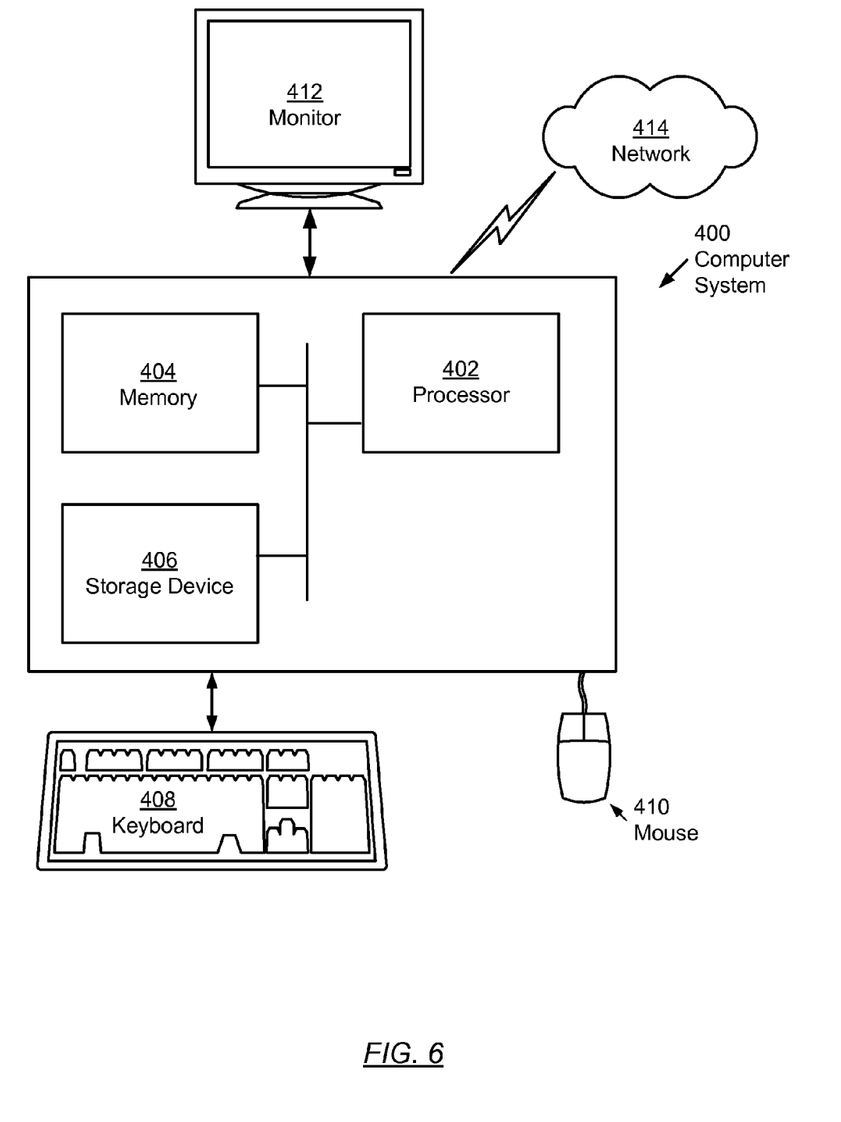
FIG. 6 shows a computer system in accordance with one or more embodiments of the invention.

Embodiments of the invention may be implemented on virtually any type of computer regardless of the platform being used. For example, as shown in FIG. 6, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., memory, processor, kernel, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing applications with a current time value, comprising:
   receiving a first trap for a first application to access a time memory page;
   creating, in a first memory map corresponding to the first application, a first mapping between an address space of the first application and the time memory page in response to the first trap;
   accessing, based on the first trap, a hardware clock to obtain a first time value; and
   updating the time memory page with the first time value,
   wherein the first application reads the first time value from the time memory page using the first memory map.

2. The method of claim 1, wherein accessing the hardware clock and updating the time memory page is performed periodically.

3. The method of claim 1, further comprising:
   receiving a second trap from a second application to access the time memory page; and
   creating, in a second memory map corresponding to the second application, a second mapping between an address space of the second application and the time memory page in response to the second trap,
   wherein the second application reads the first time value from the time memory page using the second memory map while the first mapping is in the first memory map.

4. The method of claim 1, further comprising:
   starting, in response to the first trap, a time writer thread, wherein the time writer thread accesses the hardware clock and updates the time memory page with the first time value.

5. The method of claim 1, further comprising:
   starting, in response to the first trap, a mode timer; and
   when the mode timer expires:
      changing the time writer thread to a quiesced mode; and
      removing the first mapping in the first memory map.

6. The method of claim 5, further comprising:
   prior to the mode timer expiring:
      detecting a read of the time memory page; and
      resetting the mode timer based on detecting the read of the time memory page.

7. The method of claim 1, wherein the first application is compiled by a just-in-time (JIT) compiler, wherein the JIT compiler compiles a system call for the first time value into machine code, and wherein the machine code is configured, when executed, to issue a memory read operation to read the first time value from the time memory page.

8. The method of claim 1, wherein the first application reads a second time value from the time memory page using the first memory map,
   wherein the first time value comprises a relative time value, and wherein the second time value comprises an absolute time value.

9. The method of claim 8, further comprising:
updating, by the time writer thread, the second time value;
incrementing, by the time writer thread, a seqlock counter prior to updating the time memory page;
incrementing, by the time writer thread, the seqlock counter after completing updates to the time memory page,
wherein prior to reading the first time value and the second time value, the first application obtains a first value of the seqlock counter,
wherein after reading the first time value and the second time value, the first application obtains a second value of the seqlock counter, and
wherein the first application uses the first time value and the second time value only when the first value of the seqlock counter is equal to the second value of the seqlock counter.

10. A computer system comprising:
a processor comprising a hardware clock;
memory comprising a time memory page;
a time writer thread configured to:
    access the hardware clock to obtain a first time value, and
    update the time memory page with the first time value; and
a kernel configured to:
    receive a trap for a first application to access the time memory page,
    create, in a first memory map corresponding to the first application, a first mapping between an address space of the first application and the time memory page in response to the trap, and
    trigger the time writer thread to update the time memory page,
    wherein the first application reads the first time value from the time memory page using the first memory map.

11. The computer system of claim 10, wherein the time writer thread is configured to periodically access the hardware clock and updating the time memory page.

12. The computer system of claim 10, wherein the memory further comprises:
the first memory map corresponding to the first application;
a second memory map corresponding to a second application, where the second memory map maintains a second mapping between an address space of the second application and the time memory page,
wherein the second application reads the first time value from the time memory page using the second memory map while the first mapping is in the first memory map.

13. The computer system of claim 10, further comprising:
a mode timer,
wherein the kernel is further configured to:
    start, in response to the trap, the mode timer;
    prior to the mode timer expiring:
        detect a read of the time memory page; and
        reset the mode timer based on detecting the read of the time memory page; and
    when the mode timer expires:
        change the time writer thread to a quiesced mode; and
        remove the first mapping in the first memory map.

14. The computer system of claim 10, further comprising:
a just-in-time (JIT) compiler configured to compile the first application by:
    compiling a system call for the first time value into machine code, wherein the machine code is configured, when executed, to issue a memory read operation to read the first time value from the time memory page.

15. The computer system of claim 10, wherein the time memory page comprises:
the first time value comprising a relative time value, and
a second time value comprising an absolute time value.

16. The computer system of claim 15, further comprising:
a seqlock counter,
wherein the time writer thread is further configured to:
    update, by the time writer thread, the second time value;
    increment the seqlock counter prior to updating the time memory page;
    increment the seqlock counter after completing updates to the time memory page,
    wherein prior to reading the first time value and the second time value, the first application obtains a first value of the seqlock counter,
    wherein after reading the first time value and the second time value, the first application obtains a second value of the seqlock counter, and
    wherein the first application uses the first time value and the second time value only when the first value of the seqlock counter is equal to the second value of the seqlock counter.

17. A computer readable storage medium comprising computer readable program code embodied therein for causing a computer system to perform a method, the method comprising:
receiving a first trap for a first application to access a time memory page;
creating, in a first memory map corresponding to the first application, a first mapping between an address space of the first application and the time memory page in response to the first trap;
accessing, based on the first trap, a hardware clock to obtain a first time value; and
updating the time memory page with the first time value,
wherein the first application reads the first time value from the time memory page using the first memory map.

18. The computer readable storage medium of claim 17, wherein the method further comprises:
receiving a second trap from a second application to access the time memory page; and
creating, in a second memory map corresponding to the second application, a second mapping between an address space of the second application and the time memory page in response to the second trap,
wherein the second application reads the first time value from the time memory page using the second memory map while the first mapping is in the first memory map.

19. The computer readable storage medium of claim 17, wherein the method further comprises:
starting, in response to the first trap, a mode timer; and
when the mode timer expires:
    change the time writer thread to a quiesced mode; and
    removing the first mapping in the first memory map.

20. The computer readable storage medium of claim 19, wherein the method further comprises:
prior to the mode timer expiring:
    detecting a read of the time memory page; and
    resetting the mode timer based on detecting the read of the time memory page.

* * * * *